(12) United States Patent
Bachner, III et al.

(10) Patent No.: US 6,184,654 B1
(45) Date of Patent: \*Feb. 6, 2001

(54) WEARABLE DOCKING-HOLSTER SYSTEM, WITH ENERGY MANAGEMENT, TO SUPPORT PORTABLE ELECTRONIC DEVICES

(75) Inventors: Edward F. Bachner, III, Lockport; Xin Du, Bartlett, both of IL (US)

(73) Assignee: Double-Time Battery Corporation, Lockport, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/123,775

(22) Filed: Jul. 28, 1998

(51) Int. Cl.[7] ........................................................ H02J 7/00
(52) U.S. Cl. ............................................ 320/114; 320/115
(58) Field of Search ................................... 320/112, 113, 320/114, 15, 107; 307/64, 66

(56) References Cited

U.S. PATENT DOCUMENTS

| | | | |
|---|---|---|---|
| 3,919,615 | * 11/1975 | Niecke | 320/2 |
| 4,578,628 | 3/1986 | Siwiak | 320/2 |
| 4,634,936 | * 1/1987 | Gentry et al. | 315/307 |
| 4,748,344 | 5/1988 | Sing | 307/151 |
| 4,880,713 | 11/1989 | Levine | 429/100 |
| 5,204,608 | 4/1993 | Koenck | 320/2 |
| 5,218,284 | 6/1993 | Burns et al. | 320/14 |
| 5,565,756 | 10/1996 | Urbish et al. | 320/15 |
| 5,578,391 | 11/1996 | Meyers et al. | 429/97 |
| 5,666,006 | * 9/1997 | Townsley et al. | 300/124 |
| 5,768,371 | * 6/1998 | Snyder | 379/446 |
| 5,859,481 | * 1/1999 | Banyas | 307/66 |
| 5,889,388 | * 3/1999 | Cameron et al. | 320/166 |
| 5,898,932 | * 4/1999 | Zurlo et al. | 320/101 |
| 5,914,585 | * 6/1999 | Grabon | 320/112 |
| 5,917,305 | * 6/1999 | Faulk | 320/106 |
| 5,933,496 | * 8/1999 | McKinnon | 320/110 |

OTHER PUBLICATIONS

Motorola StarTAC Celular Phone User Guide, Sep. 16, 1996.
Ericsson home–page, http://www.ericsson.com/., Jan. 8, 1999.
Qualcomm Q–Phone User Guide, 1997.

* cited by examiner

*Primary Examiner*—Peter S. Wong
*Assistant Examiner*—Pia Tibbits
(74) *Attorney, Agent, or Firm*—McDonnell Boehnen Hulbert & Berghoff

(57) ABSTRACT

A holster for a handheld, power intensive electronic device, such as a cellular telephone, incorporates within it a supplemental battery pack. The supplemental battery pack is used to recharge or maintain main, onboard battery pack of the cellular telephone and also to power certain supplemental circuits. The use of the docking-holster at least doubles the useful life of the device battery, which may be kept conveniently small.

29 Claims, 11 Drawing Sheets

WEARABLE DOCKING-HOLSTER SYSTEM, WITH ENERGY MANAGEMENT, TO SUPPORT PORTABLE ELECTRONIC DEVICES

TECHNICAL FIELD OF THE INVENTION

The present invention relates in general to power-intensive hand-held electronic devices, and more particularly to methods and apparatus for reducing power consumption in such devices by migrating many of their functions to a portable docking holster.

BACKGROUND OF THE INVENTION

Wireless phones, pagers, camcorders and other hand-held electronic devices having large power requirements have been rapidly miniaturized. To meet a market for ever-smaller, hand-held, power-intensive electronic devices, certain trade-offs are made by the designer to reduce battery size and delete features that may be favored by only small portions of the market. For example, newer cellular phones provide sufficient "standby time" for most subscribers, but only a limited amount of "talk time." Heavy users are expected to carry spare batteries and swap batteries when the first battery unit expires. To use certain other features, such as a hands-free speakerphone, the subscriber is expected to return to his or her vehicle.

The trend is to smaller radiophones (and similar devices) and multi-band and multi-mode communications. There has arisen a problem of short battery life due to the size limitation. Manufacturers are designing in reduced amounts of useful battery life to keep the size of these devices small. As of the time of writing, the currently available models include the Motorola StarTAC™ series, Ericsson 700 series, Qualcomm Q™ series cellular/PCS phones, the Sony D-WAVE Zuma™ CDMA phone and the Phillips Genie™ TCD 828 GSM phone. For multi-mode, multi-band operation, battery life is an even tougher issue to address due to the complexity of the circuitry and the electrical power required by the on-board digital signal processors which typically are in multi-mode or multi-band phones.

SUMMARY OF THE INVENTION

The present invention provides a portable docking unit system for wearable cellular/PCS phones, two-way pagers and similar devices. The present invention overcomes the above-described problems associated with using such a wearable device. The docking unit securely holds the portable device, and in preferred embodiments allows its continued use, while providing added features such as (a) a portable, battery-powered battery "saver" (b) a supplemental battery, and (c) a convenient attachment to belt or purse strap.

In preferred embodiments, a novel arrangement of the components keeps from increasing the overall thickness of the electronic device in the docking-holster, over that of the same electronic device in a traditional belt-clip.

A principal objective of the present invention is to provide a cost-effective solution to prolong the service time of a wearable phone without increasing the size of the phone.

A further objective is to provide a hidden battery pack which is blended into a holster for convenient use.

Another objective of the present invention is to provide energy management to let the hidden battery charge the main battery automatically to "save" the main battery's power during standby.

Another advantage is that the invention will allow the conventional device charger accessory to be used to charge the hidden battery.

Another objective of the present invention, in an alternative embodiment, is to use the docking-holster as a carrier of the same type battery pack as is used on the phone or other electronic device, in lieu of custom or fixed internal cells, in order to minimize the investment required of a current user to require the docking-holster of the present invention.

These objectives are accomplished in the present invention by a docking-holster system which (1) can be mechanically attached to the belt or purse strap, and (2) can electrically connect to the portable electronic device to increase the device's useful battery life. This permits prolonged use of very power-intensive, small cellular phones, etc., without reducing battery life or eliminating desirable, but occasional-use, features.

The present invention maintains the main battery of the portable electronic device near full charge, so that the device lasts longer during the day. In most embodiments, the period of usability or life is more than doubled. The docking-holster stores the electronic device between uses, but in almost all embodiments the device is also usable while nested in the docking-holster.

In one embodiment, the docking-holster can clip to a user's belt, pocket or purse strap, or can be carried without using the clip in a briefcase, pocket or purse.

In the embodiments including the one incorporating the Motorola StarTAC phone, the unit as combined with the docking-holster is much thinner than a StarTAC with both the commercially available carry-clip and "auxiliary" battery mounted to it, but yet has more power. In the case of the Qualcomm Q-Phone, this unit combined with the docking-holster according to the present invention is the same thickness as the unit with its commercially available belt-clip supplemental, and only slightly wider, yet doubles the talk-time of the device.

In certain embodiments, circuitry of the docking-holster can modify the voltage from the conventional charger, emulating a standard battery, so as to allow charging of the docking unit. The unit can also be charged by a supplemental power input, such as a travel charger, car-cord or transformer, and/or solar cells mounted to it. In certain embodiments, circuitry is provided which can modify the output voltage from the batteries within the docking-holster to properly charge the device battery, or to "save" the battery.

BRIEF DESCRIPTION OF THE DRAWINGS

Further aspects of the invention can be discerned in the following detailed description when taken in conjunction with the appended drawings, in which like characters denote like parts and in which.

DETAILED DESCRIPTION OF PREFERRED EMBODIMENTS

Figure 1:
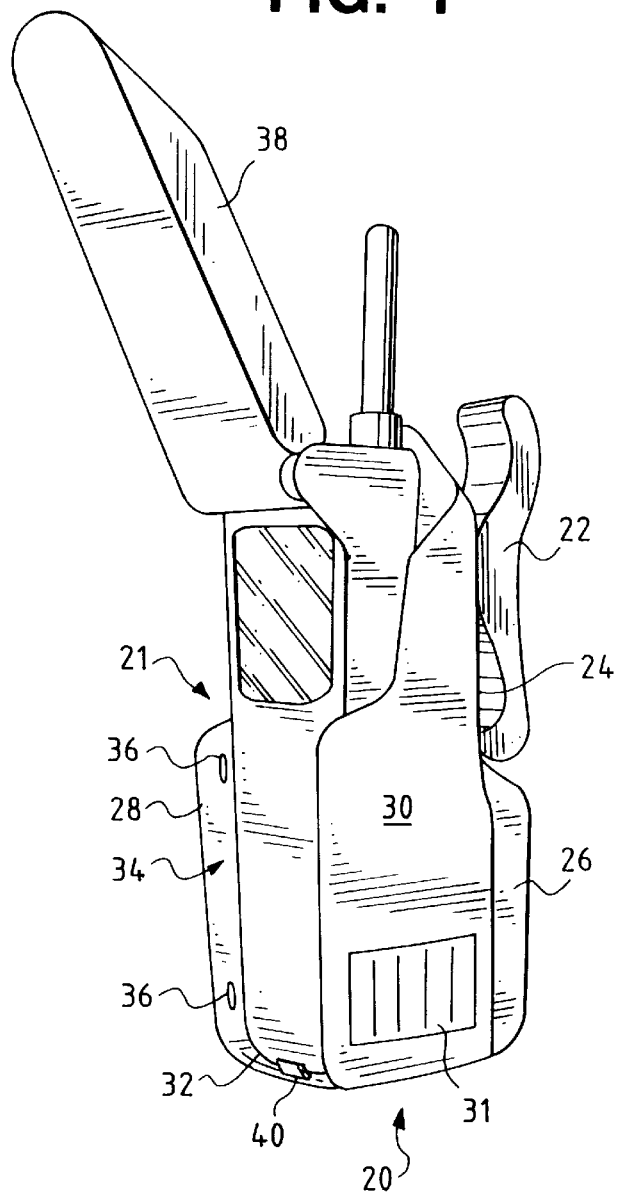
FIG. 1 is a perspective view of a docking-holster and cellular telephone assembly according to a preferred embodiment of the present invention.

FIG. 1 is a isometric view of a first embodiment of the invention. In this embodiment, a docking-holster indicated generally at 20 is designed to receive and hold a cellular telephone indicated generally at 21 of a particular make and model. Many of today's cellular telephones have distinctive shapes and it is contemplated that the precise shape of the docking-holster 20 will vary according to the make and model for which it is designed to be fit.

In the embodiment illustrated in FIG. 1, a front of the holster 20 is formed by a pair of wings 28 and 30 which extend in a frontward direction from a rear surface 24. The wings 28 and 30, in conjunction with a bottom panel or extension 32, form a cavity 34 in which the cellular phone 21 is closely held. To aid in releasably engaging the cellular telephone so that it does not inadvertently fall out, means such as dimples 36 may be formed to protrude inwardly from the wings in order to more tightly grip the sides of the cellular telephone 21.

Figure 3:
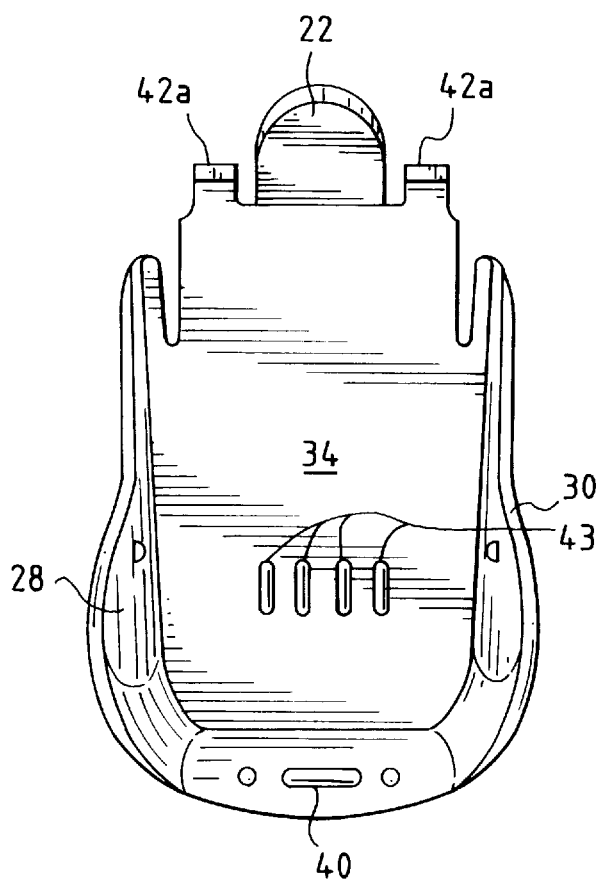
FIG. 3 is a front view of the embodiment shown in FIG. 2.

Mounted on an upper portion of the rear side 24 is a clip 22 that preferably is spring loaded, either by a separate metallic spring (not shown) or by the natural elasticity of the clip 22. As best seen in FIG. 3, the clip 22 is so designed such that a belt or a strap may pass between it and the rear portion 24.

The holster 20 includes a supplemental battery pack 26. In the embodiment illustrated in FIG. 1, the supplemental battery pack 26 is a separate unit which mounts to the rear portion 24 of the holster 20 and, preferably, below the clip 22. This is ergonomically desirable because it puts the center of gravity of the entire holster 20 at its lowest point and permits the holster 20 to more readily hang from the strap by means of clip 22. Positioning the supplemental battery pack at this location also does not increase the overall thickness of the holster.

The supplemental battery pack 26 may simply be a battery pack of the type which is furnished with the cellular telephone 21 at purchase. In this manner, the user may purchase a further commercially available battery pack 26 and may recharge it in the same way that the user recharges the main battery pack (not shown) in the cellular telephone 21. In alternative embodiments, the battery pack 26 has different electrical characteristics from the main battery of the cellular telephone 21 and may, for example, have enhanced charge storing capability.

The components defining the cavity 34 should preferably permit the operation of the cellular telephone 21 while still in the holster 20. For example, as shown in FIG. 1, the cavity 34 has an entirely open face (to the leftward in FIG. 1) that allows a cover 38 of the cellular phone 21 to be flipped upward and permits the user to ready the phone 21 for use. As seen, the sidewall 30 can hold a solar panel 31, and keep it visible so that it remains useful. In alternative embodiments (not shown), the wings 28, 30 or other means for physically holding the phone 21 in place, may not be so extensive. Various means may be used to releasably secure the telephone 21 in the holster 20, so long as the user may easily remove the telephone for use without the holster, but nonetheless have it securely held by the holster 20.

In FIG. 1, there is also visible a bottom phone connector 40, which in the illustrated embodiment is used as a communications port to supplemental devices. In other embodiments, connector 40 is a means to supply power to the device. Somewhere in the front surface or interior surface of cavity 34 will be at least two conductive contacts (not shown) which electrically connect the main battery disposed in the phone 21 to a power management circuit incorporated into the holster 20, which in turn is connected to the supplemental battery pack 26. While in the illustrated embodiment the holster 20 comes with a belt clip that is used for convenient attachment to a belt or a purse strap, in other embodiments the belt clip is omitted in order to reduce size. These other embodiments are more specifically designed for carrying inside of containers, such as purses and the like.

Figure 2:
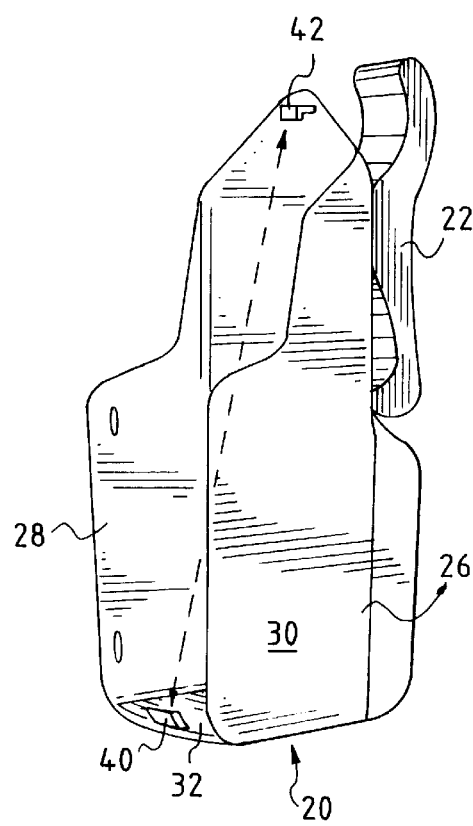
FIG. 2 is a perspective view of a second embodiment of the docking-holster, shown without a phone but with an integrated, "hidden" battery pack.

FIG. 2 is a view similar to that shown in FIG. 1, but illustrating a further embodiment in which the supplemental battery pack 26 is permanently installed in, and is hidden by, the holster 20. In this embodiment, the battery pack 26 may be of different chemistry or characteristics than the main battery of the cellular phone 21 (FIG. 1) and a power management circuit is provided to interface between the two batteries, as will be explained below.

FIG. 2 illustrates the holster 20 with the cellular telephone removed. In addition to sidewalls or wings 28 and 30, the holster 20 is provided with a top hook 42 that is disposed at its upper margin; in alternative embodiments (not shown) multiple hooks may be provided. The top hook 42 is designed to fit over the cellular phone 21. The electronic device is held in place by compression between the top retaining hook 42 and the bottom connector 40. The structural elements of the holster 20 may be formed of a durable plastic material.

FIG. 3 is an elevational view from the ventral side of a docking-holster according to the invention. Visible within the cavity 34 is a series of conductive contacts 43 which supply power and signal conductors to the wearable device. FIG. 3 also shows an embodiment in which the top hook 42 has been replaced with a pair of hooks 42a which are disposed on two either upper corners.

Figure 4:
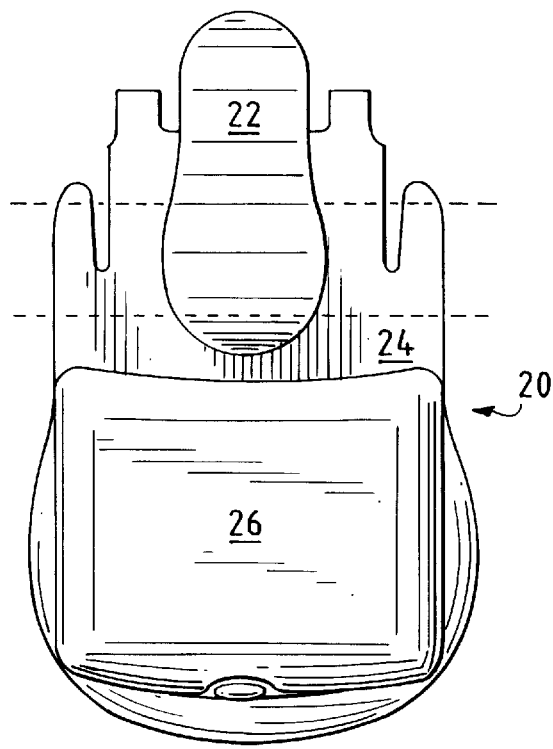
FIG. 4 is a rear view of the docking-holster shown in FIG. 1, showing a belt or strap to which the docking-holster clips in phantom.

FIG. 4 is an elevational view of a rear surface 24 of the embodiment shown in FIG. 1. In this illustrated embodiment, the supplemental battery pack 26 is removable, and is connected to the power management circuit located within the holster 20 by suitable conductive contacts.

Figure 5A:
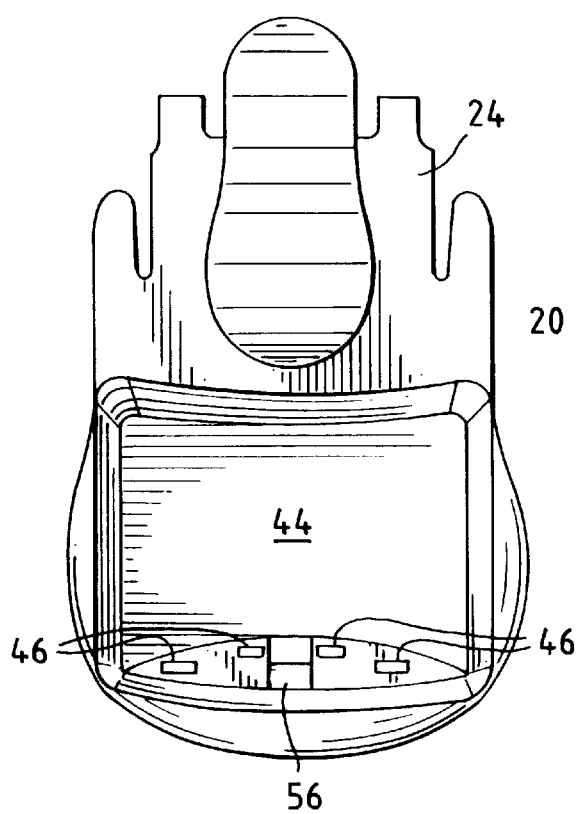
FIGS. 5a–5c are views of the docking-holster shown in FIG. 1 with its supplemental battery removed, and dorsal and ventral views of a detachable supplemental battery pack, respectively.
Figure 5B:
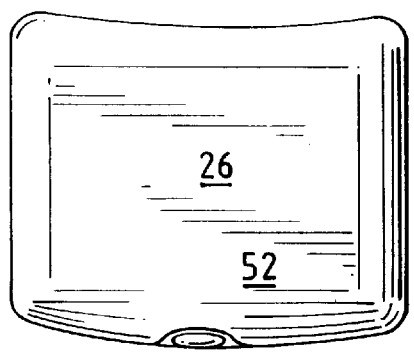
Figure 5C:
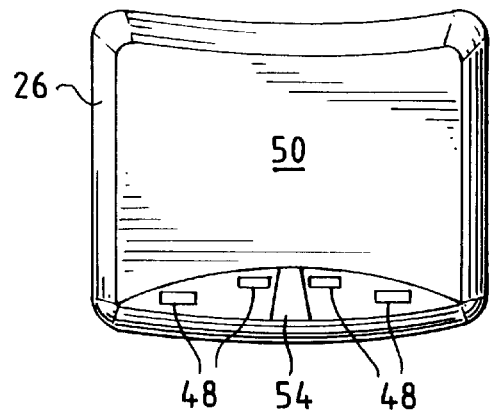

FIGS. 5a, 5b and 5c show the holster 20 and the supplemental battery pack 26 in a disassembled condition. The rear surface 24 of the holster 20 includes a receptacle 44 to which the supplemental battery pack 26 is mounted. The rear surface 24 includes four conductive contacts 46 which mate with respective conductive contacts 48 located on the ventral surface 50 of the supplemental battery pack 26. A dorsal surface 52 of the supplemental battery pack 26 is shown in FIG. 5b. It is preferred that the dorsal surface 52 of the supplemental battery pack 26 be curved to conform to mating curved surfaces of the holster 20 in order to obtain a more pleasing appearance and a shape which will not catch on other articles. As indicated in FIG. 5c, the supplemental battery pack 26 has a locking mechanism 54 which is designed to engage with a locking mechanism 56 on the rear surface 24 of the holster 20. Two of the contacts 48 and two of the contacts 46 are used to transmit power from the supplemental battery pack 26 to the main, onboard battery (not shown) in the cellular phone 21. The other two contacts may be used for signal and sensing purposes.

Figure 6:
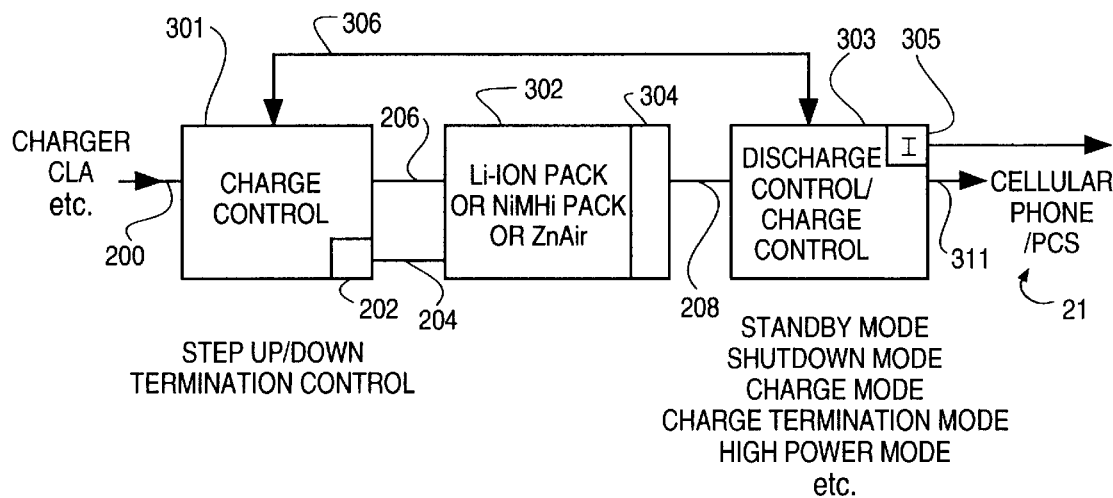
FIG. 6 is a high-level electrical block diagram of the energy management diagram of the present invention.

FIG. 6 is a high level schematic electrical diagram of the main functional blocks of the power management circuitry according to the invention. Charge from an external source, such as a standard external battery charger meant for the cellular telephone 21 or from a cigarette lighter adapter (CLA), is input on path 200 to a charge control circuit 301 on path 200. The charge control circuit 301 steps the voltage of the power received on path 200 up or down, according to the characteristics of the battery 302 which makes up a portion of the supplemental battery pack 26 (FIGS. 1–5c). The circuit 301 is also responsible for terminating the charging of the battery 302 when the battery 302 is fully charged, or upon the advent of a dangerous condition such as a high temperature or current or voltage surge. In a preferred embodiment, the charge controller 301 has a charge sensing circuit 202 as a portion thereof, which, through a path 204 to the rechargeable battery pack 302, senses the state of charge of the cells 302. A power path 206 connects the charge control circuit 301 to the rechargeable supplemental battery 302, which in the embodiment illustrated in FIG. 5 is a rechargeable lithium ion pack. The battery 302 alternatively may be nickel metal hydride, nickel cadmium or a zinc air battery or a primary battery.

Battery 302 is coupled to a discharge controller 303 by means of a supervisor circuit 304, which may be omitted in certain embodiments. Power is made available on a path 208 from the battery 302. The charge/discharge controller 303 is responsible for putting the holster 20 into any of several states, including standby mode, shutdown mode, charge mode, charge termination mode, and high power mode. In a preferred embodiment, the charge/discharge controller includes a current sensing circuit 305 which senses the amount of charging current which the main battery in phone 21 is using. As will be explained below, depending on the value of the sensed current, the discharge/charge controller enters the circuit into any of a plurality of operational modes. A communication path 306 is connected between the charge/discharge controller for the main battery 21 and the charge controller for the recharging port. The controller 303 is connected to a cellular phone by interface 311.

Figure 7:
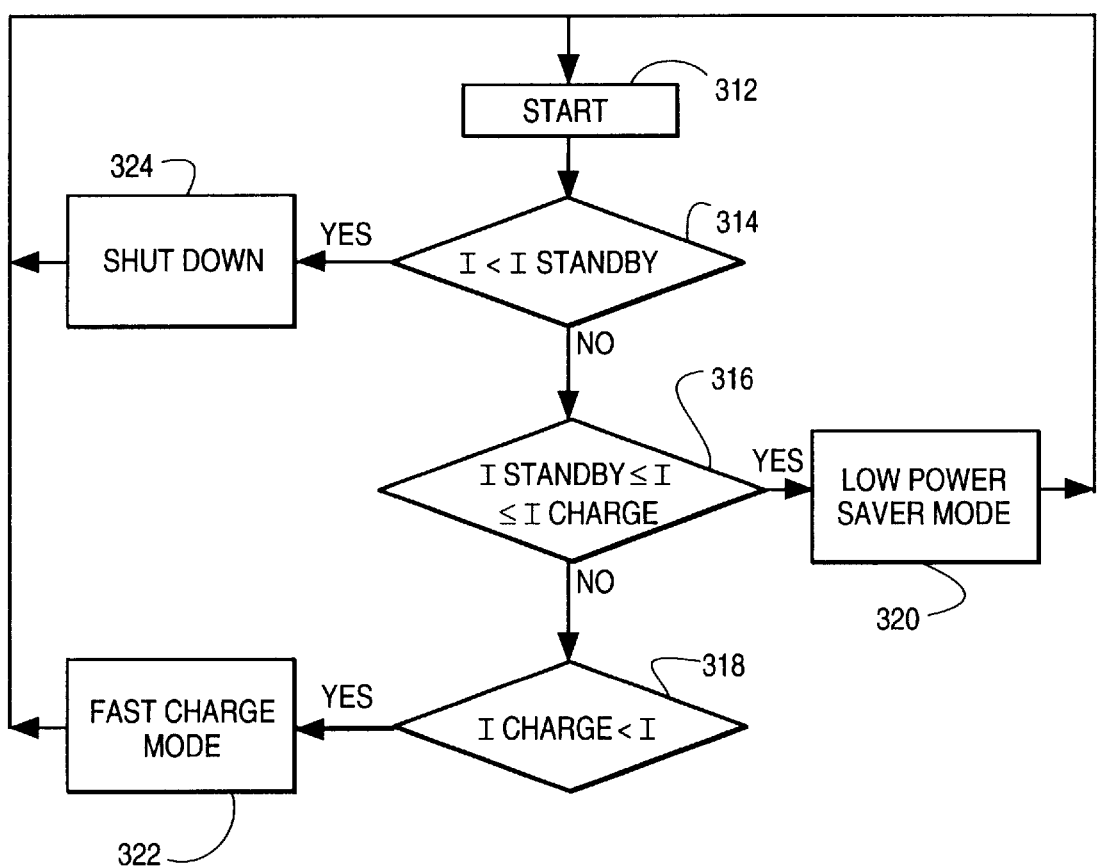
FIG. 7 is a control flow chart of an energy management circuit of the present invention.

FIG. 7 is a high-level schematic block diagram showing a logic flow chart by which charge/discharge controller 303 may control the operation of the docking-holster 20. At a start step 312, the current is read on current sensing path 313 (FIG. 6) by a current sensing circuit 305. If the sensed current is less than a predetermined, stored current ISTANDBY as determined at step 314, the discharge/charge controller 303 decides to enter the shutdown mode at 324, in which no current is supplied to the device. Otherwise, the controller goes to decision step 316. At step 316, if the current value is between the standby current value and a stored value ICHARGE, indicating a gradual drain on the supplemental battery, as many occur when the phone is on but no communication link has been established, the discharge/charge controller enters a power saver mode at step 320, during which limited power is supplied to the device. Finally, if at step 318 a predetermined charging current is determined to be less than the actual charging current, the procedure enters a step 322, which is fast charge mode for the circuit, enabling a high, optimum amount of power to be delivered to the device.

The procedure than periodically loops back to resample the current.

Figure 8:
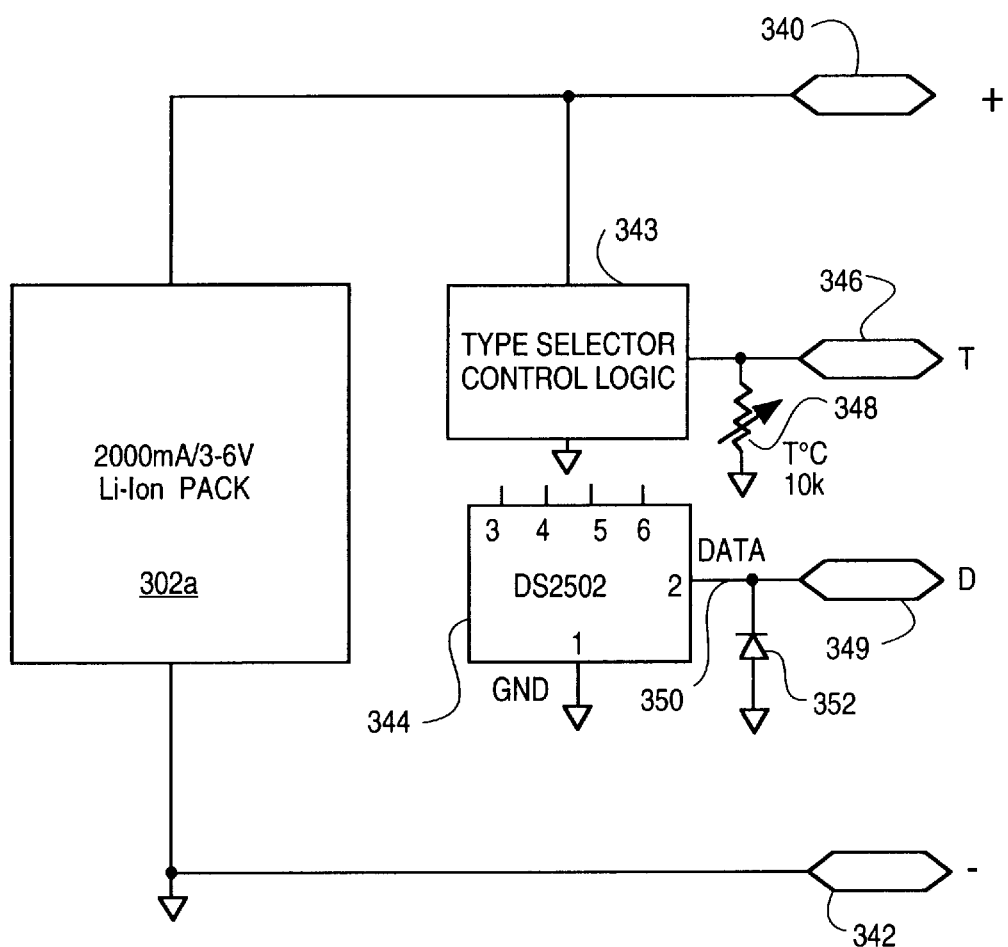
FIG. 8 is a detailed electrical schematic diagram for a docking-holster designed to receive a Motorola StarTAC phone.

FIG. 8 is a detailed electrical schematic diagram for a power management circuit used in a holster 20 adapted for use with a StarTAC™ series cellular telephone manufactured by Motorola. A lithium ion battery pack 302a is connected across the positive and negative power terminals 340 and 342. Terminals 340 and 342 connect to the "auxiliary" battery terminals located on the backside of the StarTAC™ telephone. The supplemental battery pack 302a preferably operates at 3.6 volts in order to be compatible with the voltage of the StarTAC™ phone. Because of the compatibility between the two battery types, no special control circuit is provided. An integrated circuit 343 is connected between the positive node 340 and a type selector input 346. A thermistor 348 is also connected to the output 346 so as to act as a temperature sensor. The type selector integrated circuit 344 is provided in order to distinguish chemistry and swap control. For proper operation with this Motorola embodiment, an identification integrated circuit 344 is included in the power management circuit, and has a data line 350 connected to a data output 349. A diode 352 connects the node 350 to ground for ESD protection purposes.

Figure 9:
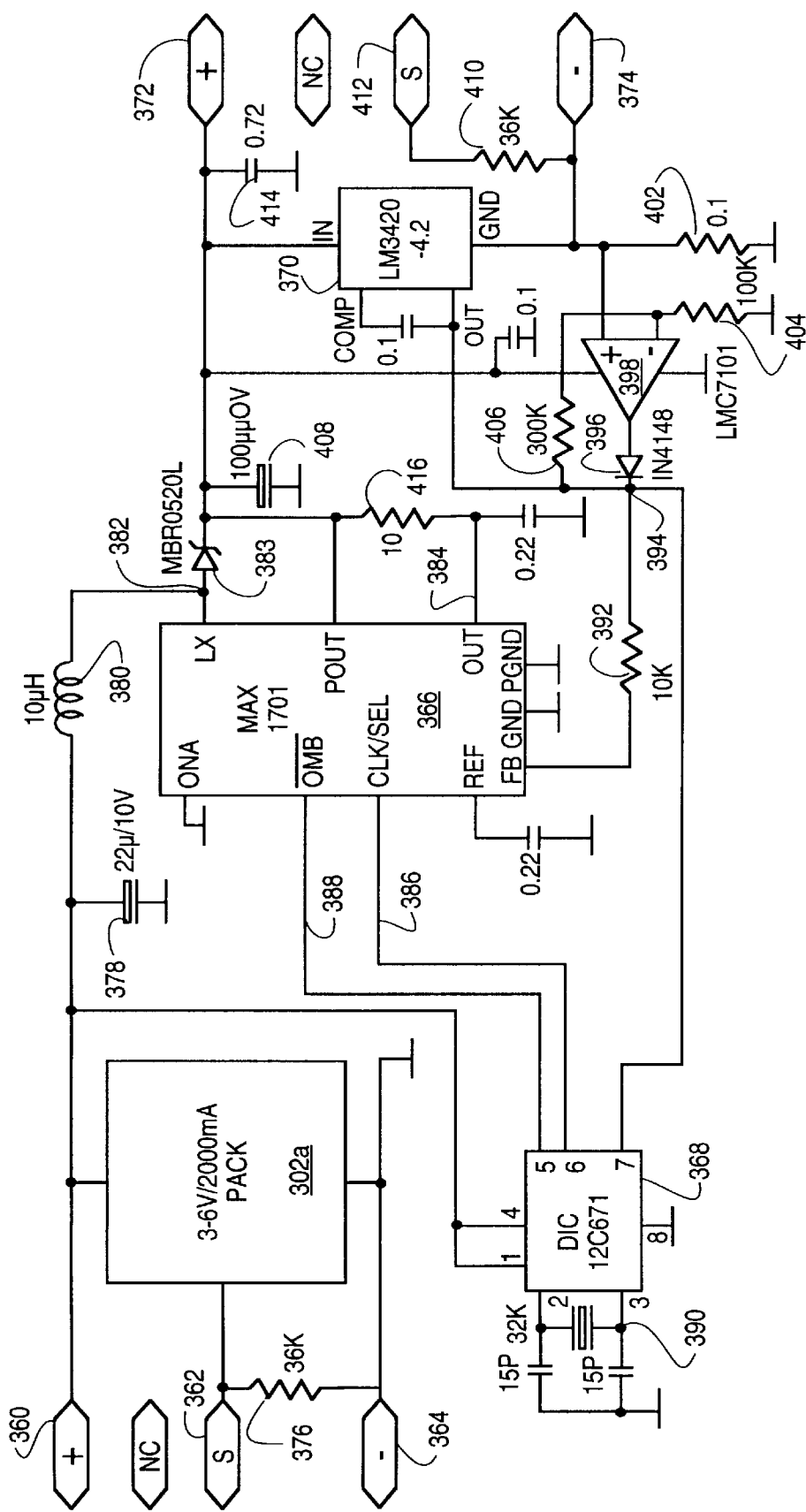
FIG. 9 is a detailed electrical circuit diagram for a docking-holster designed to receive a QUALCOMM Q-Phone.

FIG. 9 is a detailed electrical schematic diagram showing a power management circuit particularly adapted for the Qualcomm Q™ phone. In this embodiment, a 3.6 volt, 2000 milli amp battery pack 302a is connected between a positive battery pack terminal 360 and a negative battery pack terminal 364. A terminal S 362 is further connected to the pack 302a and is connected to the negative battery pack terminal 364 by a battery type indicator resistor 376, which in one embodiment may be 36 kilo ohms.

Directly connected to the positive supplemental battery pack terminal is a capacitor 378 connected between the node 360 and ground. An inductor 380, which for example can be 10 microhenries, connects the node 360 to an input node 382 that is in turn connected to the integrated circuit 366.

A DC to DC convertor chip 366, such as the Max 1701, is used to step up the voltage appearing across leads 360 and 364 to a higher voltage across leads 382 and 384. The voltage across leads 360 and 364 may come from courses such as a standard charger, the sidewall mounted solar array 31 (see FIG. 1) or a cigarette lighter adapter. A low power microcontroller chip 368 is connected by a clock line 386 and a data line 388 to the DC to DC convertor chip 366. The microcontroller derives its power from positive input terminal 360. A crystal 390 provides a clock signal to the microcontroller 368. The microcontroller 368 includes an EPROM (not shown) that stores the predetermined values for ICHARGE and ISTANDBY and the control logic using these values.

A feedback resistor 392 connects a feedback pin FB to a node 394, which in turn is connected to a pin 7 of the microcontroller 368. A diode 396 connects an output of an operational amplifier 398 to the node 394. A positive input of the op amp 398 is connected to a node 400, which is connected to ground by an 0.1 ohm current sensor resistor 402. A negative terminal of the op amp 398 is connected by a 100 kilo ohm resistor 404 to ground. The negative input is also connected via a 300 kilo ohm resistor 406 to the node 394. A charge controller integrated circuit 370 has an output connected to the node 394 and an 0.1 picofarad capacitor 408 connected to a COMP pin of the charge controller 370. The ground of the charge controller 370 is connected to node 400, while a power input is connected to a battery power management output node 372. A battery type indicator resistor 410, which for example may be 36 kilo ohms, is connected between the negative power management circuit output 374 and an "S" or sensor output 412. A capacitor 414 is connected to the positive output node 372. A "P" out pin of the DC to DC convertor chip 366 is connected to the positive output node 372. The positive output node 372 is connected by a 10 ohm resistor 416 to node 384. Node 382 is connected to node 372 by a Schottky diode 383.

In the embodiment shown in FIG. 9, the microcontroller 368 sends a 2-bit parallels signal on lines 386 and 388 to the chip 366 to switch chip 366 to shutdown mode, standby mode or fast charge mode, depending on the binary values of lines 386 and 388. Microcontroller 368 senses the current demand from the device through pin 7 and node 394, which in turn is the output of op amp 398. Op amp 398 in turn senses the current passing through current sense resistor 402 and amplifies to node 394.

The charge control integrated circuit 366 outputs power on its LX pin to node 382. In the shutdown mode, no power will appear at node 382. In standby mode, a pulse width modulation (PWM) circuit incorporated into the integrated circuit 366 will output a wave form on node 382 having a predetermined pulse width. This signal passes through the Schottky diode 383 and is integrated by the capacitor 408, which for example may be 100 microfarads. In fast charge mode, the pulse width appearing at node 382 has the maximum width which is optimum for the device being charged at output ports 372 and 374.

In fast charge mode, the circuit transitions between a constant-current mode of operation, controlled by op amp 398, and later a constant-voltage operation, controlled by the lithium ion control circuit 370. When the voltage as measured across ports 372 and 374 reaches a certain value such as 4.2 volts, the output port of circuit 370 controls the feedback signal to the control circuit 366. Thereafter, the power appearing at node 382 is of a constant voltage rather than a constant current.

The microcontroller 368 may be programmed with a plurality of control algorithms, which then would be stored in an onboard EPROM (not shown). The DC to DC convertor 366 operates up to a ninety-six percent conversion efficiency, thereby minimizing energy loss. The power management circuit illustrated in FIG. 9 performs constant current, constant voltage charging to the main battery via output ports 372 and 374. When the main battery (not shown) is full, the circuit shown in FIG. 9 switches to a standby, low power mode or shutdown if the cellular phone 21 (FIG. 1) is not turned on.

Figure 10:
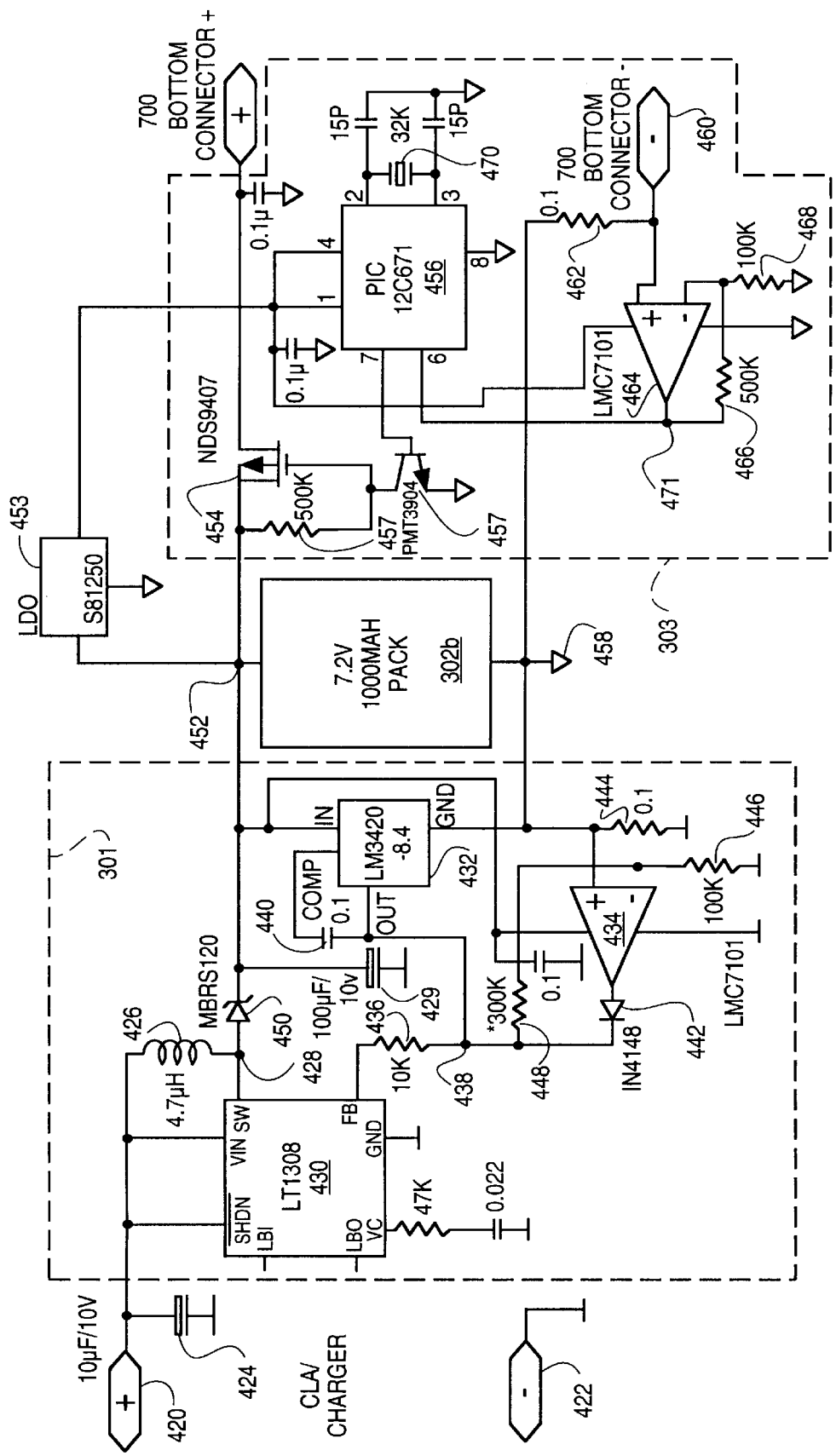
FIG. 10 is a detailed electrical circuit diagram for a docking-holster designed to receive an Ericsson 700 series cellular telephone.

FIG. 10 is a schematic electrical diagram of a power management circuit according to the invention, as particularly adapted for an Ericsson 700 series of cellular telephones. The positive and negative charger or CLA inputs are shown at 420 and 422. A capacitor 424 is connected from the node 420 to ground, and a 4.7 microhenry inductor 426 is connected in series to a node 428. The capacitor 424 and inductor 426 condition the input power. Forming the functional block 301 are a series of integrated circuits 430, 432 and 434. Chip 430 is step-up regulator and performs the function of a DC to DC converter. A feedback input pin FB of the chip 430 is connected via a 10 kilo ohm resistor 436 to a node 438, which is connected to an OUT pin of a lithium ion charge controller integrated circuit 432. The output pin is connected to a COMP pin of the integrated circuit 432 by an 0.1 microfarad capacitor 440. A diode 442 connects an output of the op amp 434 to the node 438. The positive input of the op amp 434 is connected to a phone ground node, which is connected to charger ground by an 0.1 ohm resistor 444. A negative input of the op amp 434 is connected to a 100 kilo ohm resistor 446 to ground, and a 300 kilo ohm resistor 448 is connected to the node 438.

A Schottky diode 450 connects the node 428 to a positive battery node 452; this is also connected to an input of the lithium ion charge controller 432 and a field effect transistor 454. A resistor 456, which can be 500 kilo ohms, is connected to a pin 7 of a microcontroller 456, which can be a PIC 12C671. A gate of the FET 454 is connected to pin 7 of the microcontroller 456 to control the different modes of operation of the power management circuit.

A positive input of the op amp 434 is connected to a terminal 458 of the battery pack 302b; the battery pack 302b is connected between nodes 452 and 458. The negative battery pack terminal 458 is connected to an output node 460 by an 0.1 ohm resistor 462.

An operational amplifier 464 has an input connected to pin 6 of the microcontroller 456. A positive input of the op amp 464 is connected to negative output terminal 460. A resistor 457, which for example can be 500 kilo ohms, connects the negative input of the op amp 464 back to its output. The negative input is connected by a further resistor, such as 100 kilo ohms, 468, to ground. A clock signal is provided to the microcontroller 456 by a crystal 470. The microcontroller 456, op amp 464 and related components form functional block 303 as introduced in FIG. 5.

In FIG. 10, an 8.4 volt constant current, constant voltage charging function is performed by functional block 301. Block 303 provides a buffer between the battery pack 302b, which can be of a different chemistry than the onboard, main battery of the cellular phone 21. Inputs 420 and 422 can connect either to a standard charger, to a sidewall mounted solar energy array (through a diode, not shown) or to a cigarette lighter adapter (CLA).

In FIG. 10, the chip 430, which can be an LT130B made by Linear Technologies, Inc., sets up the voltage and produces a PWM signal on node 428, which in turn is integrated by the capacitor 429 (which can be 100 microfarads). The power appearing at node 428 can be either of the constant-current or constant-voltage variety, depending on the voltage appearing at node 452. If the voltage appearing at node 452 is less than approximately 8.4 volts, power will be provided by the chip 430 in constant-current node. In this mode, the op amp 434 senses the current going through current sense resistor 444 and amplifies this current to appear at node 438. Node 438 has a value which is fed back to the feedback pin FB of the integrated circuit 430. This in turn will control the width of the pulse appearing at node 428.

In constant-voltage mode, chip 432 preempts the function of the op amp 434, which is isolated from the node 438 by diode 442. In constant-voltage mode, the voltage appearing at node 452 will be constant even if the current begins declining. Constant-voltage mode is entered as the battery gets close to its rated capacity, while constant-current mode occurs before the battery is fully charged.

The microcontroller 456 gates the power through P-channel field effect transistor 454 through a bipolar transistor 457. The microcontroller has two control modes. In the first control mode, the field effect transistor 454 is shut off except for brief intervals during which the microcontroller samples the current. The current sampling is performed by looking at the output 471 of the op amp 464, which in turn derives its output from the amount of current going through current sense transistor 462. In the other mode, the microcontroller 456 gates the field effect transistor 454 to an open condition, allowing power to pass to the positive output terminal. The microcontroller shifts between shutdown mode and not-shutdown mode according to whether the value of current going through the sense resistor 462 is less than or greater than ISTANDBY.

Figure 11:
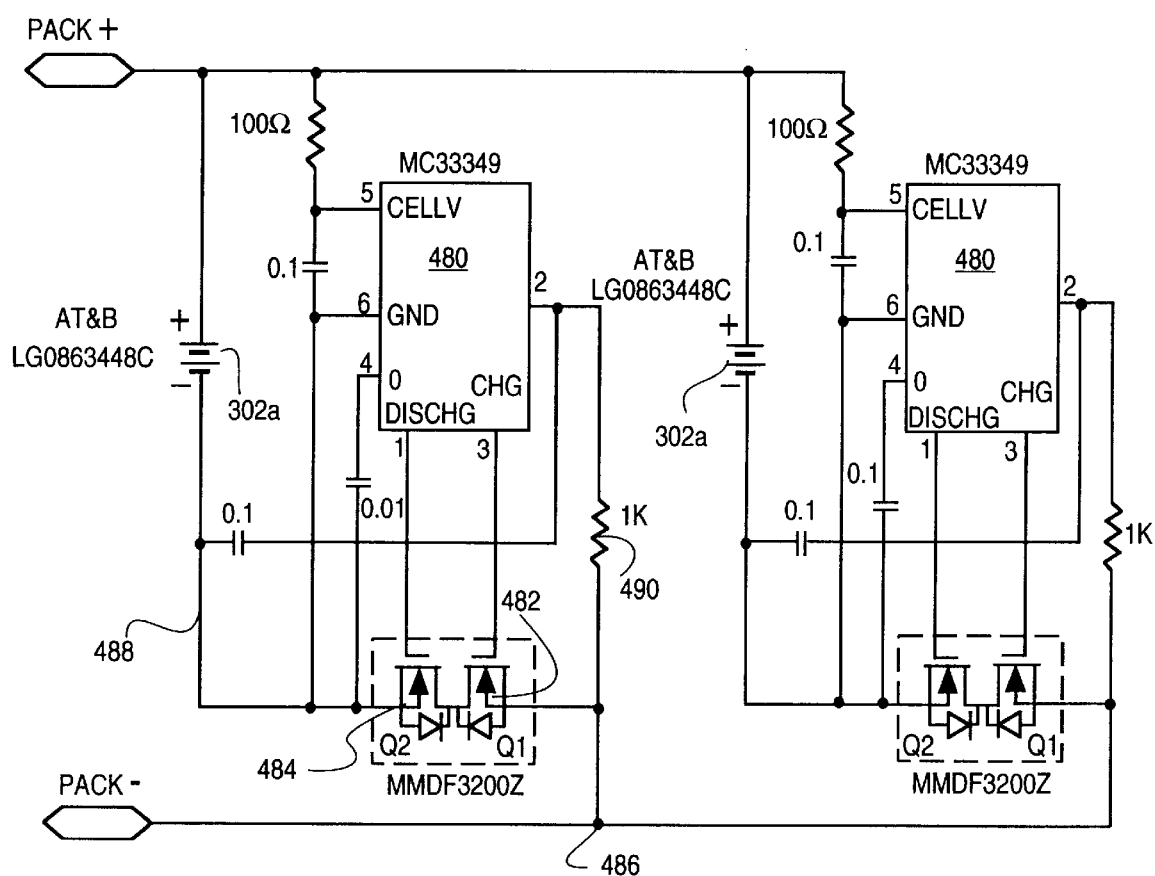
FIG. 11 is a circuit diagram for a supplemental battery pack used with the embodiments of FIGS. 8 and 9.

FIG. 11 is a detailed electrical schematic diagram of a 3.6 volt, 2000 mAh lithium ion supplemental battery pack with pack supervisor protection circuitry. Each of the cells 302a, which physically are of a prismatic design the preferred embodiment, are connected in parallel between output terminals PACK+ and PACK− through their respective FETs, which can be MMDF3200Z transistor pairs as shown. Each of the cells 302a has a supervisory integrated circuit 480, which for example can be an MC33349. Each of the supervisor integrated circuits 480 has a CHARGE output that is connected to a N-channel field effect transistor 482. The supervisor integrated circuit 480 also has a DISCHARGE output connected to the gate of a further N-channel field effect transistor 484. Transistors 482 and 484 have their current paths connected in series between a node 486, which is connected to PACK−, and a node 488, which is connected to the negative terminal of the battery 302a. A body diode of transistor 484 permits current from node 488 to 486, while a body diode of the field effect transistor 482 permits current from node 486 to node 488. A pin 2 of the IC 480 is connected through a 1 kilo ohm resistor 490 to the node 486. The circuitry is duplicated for the other cell 302a illustrated.

Figure 12:
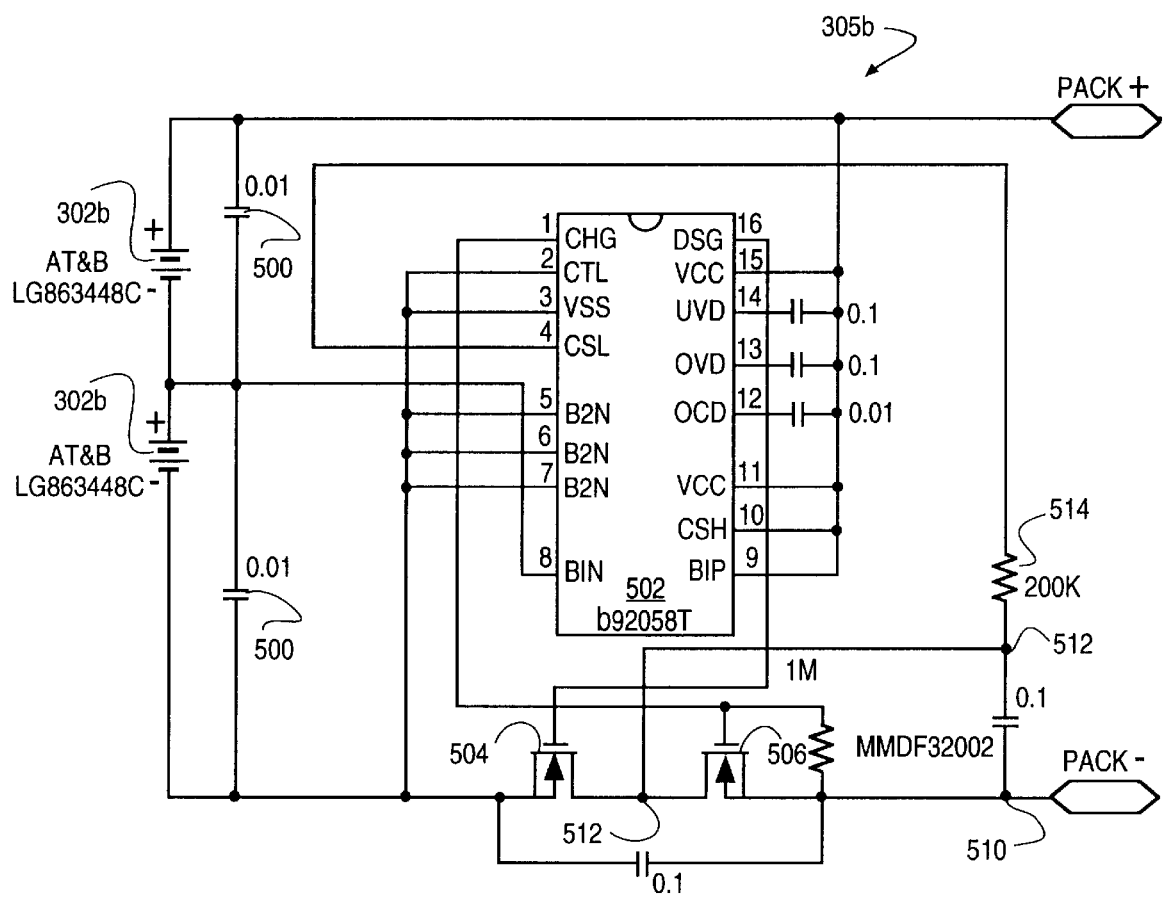
FIG. 12 is a circuit diagram for a battery pack used with the embodiment of FIG. 9.

FIG. 12 is a detailed schematic electrical diagram of a further supplemental battery pack. A pair of cells 302b, which together produce 7.2 volts and 1000 milli amp hours, are connected in series and are bridged by small value (such as 0.01 picofarad) capacitors 500. A power supervisor protection integrated circuit 502, which for example can be a Benchmarq BQ2058T, issues signals to the gates of a pair of field effect transistors 504 and 506. The transistor 506 receives a CHARGE signal to energize the transistor 506 during a charge mode, while transistor 504 is energized during a discharge mode. The transistors 504 and 506 have their current paths connected in series, as before, between a negative battery terminal 508 and a negative battery pack terminal 510. A node 512 between the current paths of the FETs 504 and 506 is connected via a resistor 514, which can be 200 kilo ohms, to an CSL pin of the IC 502. The node 512 is connected by an 0.1 picofarad capacitor to the battery pack negative output node 510. The output node 510 is connected by a further 0.1 picofarad capacitor to negative battery terminal 508. The supplemental battery pack shown in FIG. 12 has two cells placed in series in order to provide the increased voltage required by an Ericsson 700 series cellular telephone.

Figure 13A:
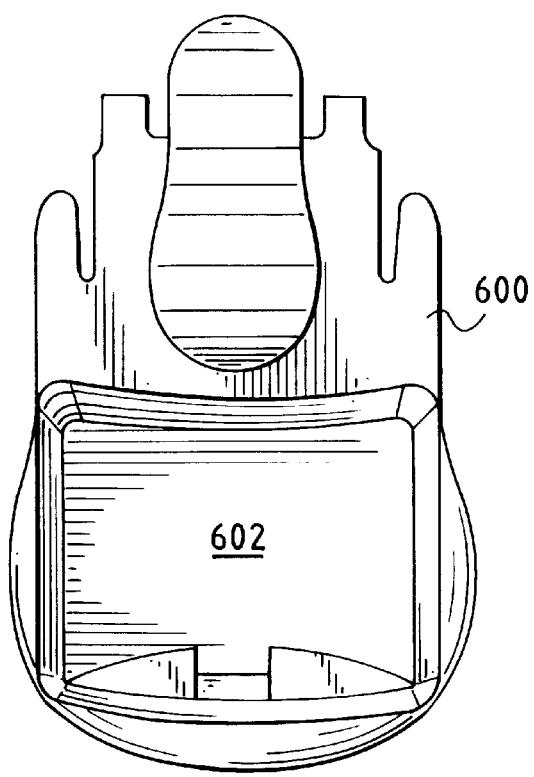
FIG. 13 is an elevational view of a further embodiment of the invention, omitting the energy management circuit of the invention.
Figure 13B:
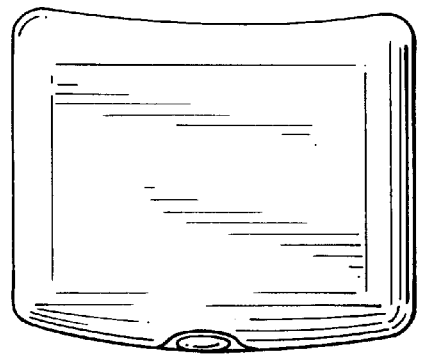
Figure 13C:
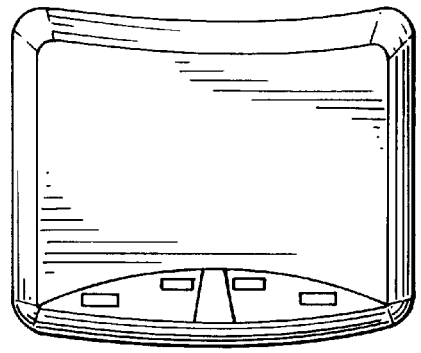

FIG. 13 illustrates an elevational view of a docking-holster according to a further embodiment of the invention, which does not have any of the power management circuitry shown in the earlier embodiments. In this embodiment, a holster 600 is provided which can be carried on a belt or strap, as before and which further provides a space 602 for a supplemental battery, which can be of the same kind as that issued by the manufacturer of the cellular telephone or other handheld device which is designed to be carried by the holster 600. Holster 600 provides a convenient means of carrying both a handheld portable device, such as a cellular telephone and a supplemental battery pack for such a unit. In using this embodiment, the user simply changes out one battery for the other to extent the useful life of the device between recharging sessions.

In summary, a novel docking-holster for use in conjunction with a cellular telephone or other handheld, power intensive electronic device has been shown and described. The docking-holster has a supplemental battery pack, which may either be hidden inside the unit or may be detachable. If the supplemental battery pack is of the detachable kind, conveniently it can be the same as the commercially available battery pack for use with the electronic device for which the holster is designed. Power management circuitry is also incorporated into the holster to reduce unnecessary power consumption and to provide overcharge protection.

While the present invention has been described in conjunction with the illustrated embodiments and the above detailed description, the present invention is not limited thereto but only by the scope and spirit of the appended claims.

We claim:

1. A docking holster for use with a power-intensive portable electronic device, comprising:
    means for attaching the holster to an article of attire of the user;
    a body of the holster defining an open cavity for receiving the electronic device, the cavity having an interior surface, at least two conductive contacts disposed on the interior surface of the cavity to mate with respective conductive contacts of the electronic device;
    a supplemental battery pack mounted in the holster and electrically coupled to the conductive contacts on the interior surface of the cavity; and
    a power management circuit, mounted in the holster, for selectively coupling the supplemental battery pack to the conductive contacts of the holster.

2. The docking holster of claim 1, wherein the power management circuit includes a current sensor for sensing current going through at least one of the conductive contacts, the power management circuit controlling the connection of the supplemental battery pack to the conductive contacts as a function of the sensed current.

3. The docking holster of claim 1, wherein the supplemental battery pack is detachable from the holster.

4. The docking holster of claim 3, wherein the docking holster is designed to receive a portable electronic device of a predetermined design and wherein a standard battery pack is commercially available for use with the portable electronic device of the predetermined design, wherein the standard battery pack is used as the supplemental battery pack.

5. The docking holster of claim 1, wherein the electronic device has a main battery which is not a part of the holster but which is coupled to conductive contacts of the holster when the electronic device is fitted within the cavity of the holster, the power management circuit being capable of sensing the amount of charge of the main battery and controlling the charging of the main battery from the supplemental battery as a function of the amount of charge of the main battery.

6. The docking holster of claim 1, wherein the cavity is formed so as to permit the operation of the electronic device while the electronic device is still in the holster.

7. The docking holster of claim 1, wherein the electronic device is a cellular telephone.

8. A docking unit for a handheld, power-intensive electronic device, the electronic device having a rechargeable battery and at least two electrical power contacts, the docking unit comprising:

a receiving surface of the docking unit adapted to receive the electronic device, at least first and second contacts disposed on the receiving surface of the cavity for connection to respective ones of the electrical power contacts of the electronic device;

a supplemental battery mounted on the docking unit and coupled to the first and second contacts for delivering power to the main battery; and a power management circuit mounted in the docking unit, the power management circuit selectively coupling the supplemental battery to the first and second contacts, the power management circuit including a sensor for periodically sensing the amount of charge of the main battery, a current value store of the power management circuit storing a standby current value and a fast charge current value, the power management circuit entering a shutdown mode and cutting power to the electronic device if the sensed current is less than the standby current value, the power management circuit entering a standby mode if the sensed current is greater than or equal to the standby current value but less than the fast charge current value and delivering a controlled amount of power which is less than a maximum optimum amount of power to the electronic device, the power management circuit entering into a fast charge mode if the sensed current is greater than or equal to the fast charge current value and delivering the maximum optimum amount of power to the electronic device.

9. The docking unit of claim 8, further comprising a pair of recharger power contacts mounted on the docking unit and selectively couple by the power management circuit to the supplemental battery, the power management circuit including a supplemental battery charge level sensing circuit coupled to the supplemental battery for sensing the charge level thereof, the power management circuit permitting recharging of the battery by a standard recharger at or below the charge level.

10. The docking unit of claim 8, wherein the electronic device is a cellular telephone.

11. A docking unit for a portable electronic device, the docking unit comprising:

a receiving surface adapted to receive the electronic device;

at least two conductive contacts for electrically connecting to the electronic device;

a supplemental battery mounted in the docking unit; and a power management circuit, mounted in the docking unit, for selectively coupling the supplemental battery to the conductive contacts, a current sensor of the power management circuit periodically sensing the current demanded by the electronic device.

12. The docking unit of claim 11, wherein the portable electronic device has a rechargeable main battery and at least two power contacts, and wherein the conductive contacts mate with the power contacts.

13. The docking unit of claim 11, further comprising a pair of recharger contacts, wherein the power management circuit includes a charge control circuit for selectively coupling the supplemental battery to the recharger contacts for recharging the supplemental battery.

14. The docking unit of claim 13, wherein the charge control circuit has a charge sensing circuit for sensing the charge of the supplemental battery.

15. The docking unit of claim 14, wherein the portable electronic device has a rechargeable main battery, the main battery being of a different chemistry than that of the supplemental battery, and wherein the power management circuit provides a buffer between the supplemental battery and the main battery.

16. The docking unit of claim 11, wherein the supplemental battery is detachable from the docking unit.

17. The docking unit of claim 16, wherein the docking unit is designed to receive a portable electronic device of a predetermined design and wherein a standard battery is commercially available for use with the portable electronic device of the predetermined design, wherein the standard battery is used as the supplemental battery.

18. The docking unit of claim 11, wherein the supplemental battery is concealed within the docking unit.

19. The docking unit of claim 11, wherein the portable electronic device is operable while the electronic device is received in the docking unit.

20. The docking unit of claim 11, wherein the portable electronic device is a wireless communications device such as a cellular telephone.

21. The docking unit of claim 11, wherein the power management circuit includes a discharge controller for controlling the connection of the supplemental battery to the conductive contacts as a function of the sensed current.

22. The docking unit of claim 21, wherein the discharge controller cuts power if the sensed current is less than a standby current value.

23. The docking unit of claim 21, wherein the discharge controller delivers a maximum optimum amount of power if the sensed current is greater than or equal to a fast-charge current value.

24. The docking unit of claim 23, wherein the discharge controller delivers a controlled amount of power which is less than the maximum optimum amount of power and greater than zero if the sensed current is greater than or equal to a standby current value but less than the fast-charge current value.

25. The docking unit of claim 11, further comprising means for attaching the docking unit to an article of attire of the user.

26. A docking holster for a wireless communications device having a rechargeable main battery and at least two power contacts, the docking holster comprising:

a body of the holster having a front surface and a rear surface, the front surface defining an open cavity for receiving the wireless communications device, the cavity having an interior surface;

at least two conductive contacts disposed on the interior surface of the cavity to mate with the power contacts of the wireless communications device;

a supplemental battery pack mounted on the rear surface of the body of the holster;

a clip mounted on the rear surface of the body of the holster for attaching the holster to an article of attire of the user;

a pair of recharger contacts; and a power management circuit mounted in the docking holster, the power management circuit including a charge control circuit for selectively coupling the supplemental battery pack to the recharger contacts for recharging the supplemental battery pack, a charge sensor for sensing the current going through at least one of the conductive contacts, and a discharge controller selectively coupling the supplemental battery pack to the conductive contacts as a function of the sensed current.

27. The docking holster of claim 26, wherein the discharge controller cuts power if the sensed current is less than a standby current value.

28. The docking unit of claim 26, wherein the discharge controller delivers a maximum optimum amount of power if the sensed current is greater than or equal to a fast-charge current value.

29. The docking unit of claim 28, wherein the discharge controller delivers a controlled amount of power which is less than the maximum optimum amount of power but greater than zero if the sensed current is greater than or equal to a standby current value but less than the fast-charge current value.

* * * * *